UNITED STATES PATENT OFFICE.

MARCO ROSSI, OF BARCELONA, SPAIN.

METHOD FOR THE MANUFACTURE OF FUEL.

1,171,660.  Specification of Letters Patent.  Patented Feb. 15, 1916.

No Drawing.  Application filed May 17, 1913. Serial No. 768,387.

*To all whom it may concern:*

Be it known that I, MARCO ROSSI, a subject of the King of Italy, residing at 2 Rue Obispo, Barcelona, Spain, have invented a certain new and useful Method for the Manufacture of Fuel, of which the following is a specification.

The present invention has for its object a method of manufacture of fuel in an agglomerated form or as briquets from coal with or without the addition of other combustible substances and with or without the admixture of binding substances such as pitch, tar and the like.

According to the invention the substance or mass to be agglomerated is treated with carbon bisulfid whereby the binding substances when such are employed may be used in a much smaller proportion than is now usual.

The treatment may take place before the mass is submitted to pressure or molding or during this operation.

It may be effected in a cold state or at a higher or lower temperature and the carbon bisulfid may be applied in the gaseous or liquid state.

As an example of the application of the process I may use a machine such as is usually employed for the manufacture of agglomerated substances and I may provide a generator of carbon bisulfid so disposed and connected that the discharge tube of this generator permits of the passage of the carbon bisulfid into the receptacle where the mixture and the kneading of the substances to be agglomerated are effected. Thus the carbon bisulfid penetrates through the inter-molecular spaces and dissolves or softens more or less considerably those hydrocarbons contained in the coal or added for the purpose of agglomeration, the result being that the mass thus treated after being submitted to pressure or molding possesses a high mechanical resistance.

The method is economical since it permits of treatment by the use of a relatively small quantity of the solvent and this in such a manner as to obtain agglomerated mass in a good coherent condition even when treating coal which agglomerates with difficulty.

What I claim as my invention and desire to secure by Letters Patent is:—

1. A process for manufacturing fuel in an agglomerated form, consisting in treating with carbon bisulfid a carbonaceous substance or mass adapted to be softened by it and then molding the mass, substantially as described.

2. A process for manufacturing fuel in an agglomerated form, consisting in treating with carbon bisulfid a carbonaceous substance or mass and a binder adapted to be softened by the said carbon bisulfid, and then molding the treated mass, substantially as described.

In testimony whereof I have hereunto signed my name to this specification in the presence of two subscribing witnesses.

MARCO ROSSI.

Witnesses:
  C. BONETALINA,
  NARCIS JUBERT.

Copies of this patent may be obtained for five cents each, by addressing the "Commissioner of Patents, Washington, D. C."